Dec. 13, 1966  D. H. SANDELL  3,291,898
HIGH VOLTAGE EXPANDED ELECTRICAL CONDUCTORS
Filed Jan. 21, 1964  2 Sheets-Sheet 1
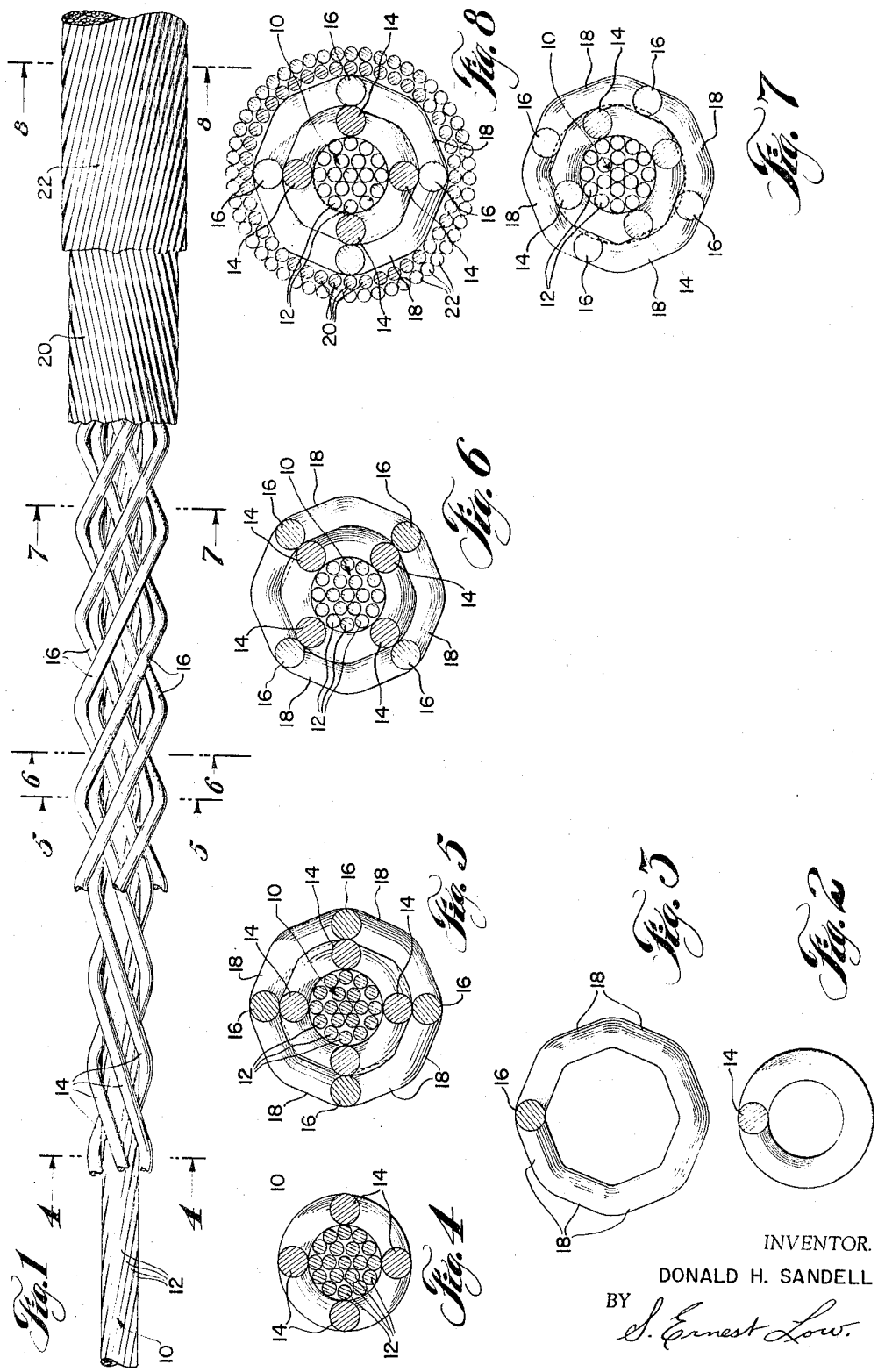
INVENTOR.
DONALD H. SANDELL
BY S. Ernest Low.
ATTORNEY Dec. 13, 1966 D. H. SANDELL 3,291,898
HIGH VOLTAGE EXPANDED ELECTRICAL CONDUCTORS
Filed Jan. 21, 1964 2 Sheets-Sheet 2
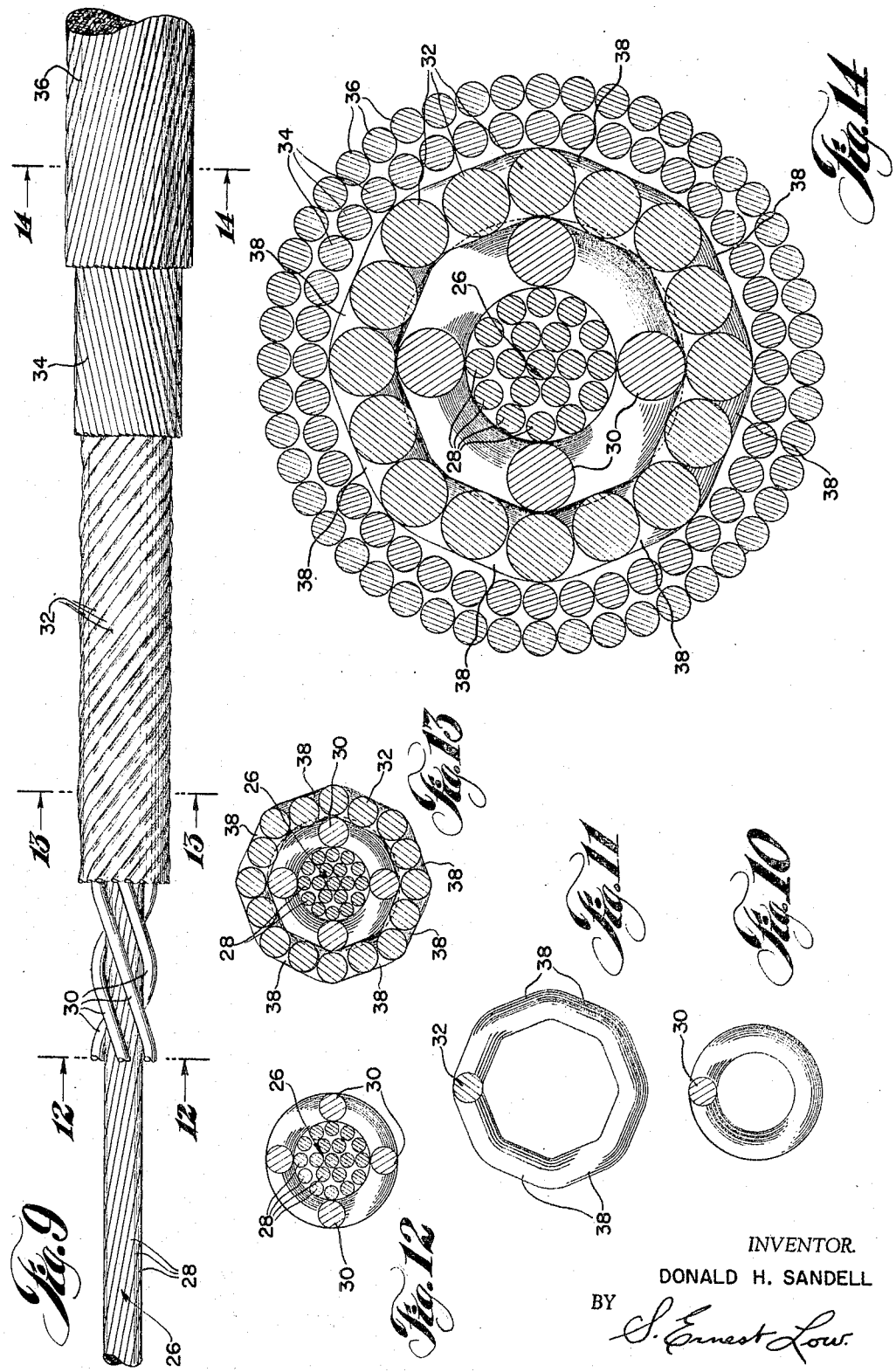
INVENTOR.
DONALD H. SANDELL
BY S. Ernest Low.
ATTORNEY United States Patent Office 3,291,898
Patented Dec. 13, 1966

3,291,898
HIGH VOLTAGE EXPANDED ELECTRICAL CONDUCTORS
Donald H. Sandell, Rome, N.Y., assignor to Aluminum Company of America, Pittsburgh, Pa., a corporation of Pennsylvania
Filed Jan. 21, 1964, Ser. No. 339,146
6 Claims. (Cl. 174—131)

This invention relates generally to electric cable or conductor structures particularly suitable for high voltage overhead or aerial electric power distribution and transmission line systems and installations. The cable or conductor structures herein contemplated are of the expanded type and provide, for a given weight of conductor metal encompassed therewithin, an exterior diameter of circumferentially exposed conductor strands appreciably larger than obtains in conventional close concentric contacting helically wound non-interiorly ventilated stranded cable or conductor structures.

Considerable advance has been accomplished in the art addressed to expanded electric conductors and cables, with minimization of corona loss one, if not the most, significant advantage accruing thereto. On the other hand, ever-increasing demand for higher potential and capacity in expanded conductors has been recognized as a source of increased heating of conventional expanded conductors to the degree that their enlarged circumference and increased capacity has not been fully utilized. The increased heating conditions herein contemplated may result from instantaneous short-circuit or surcharging of the conductor, or may be a normally existing condition in high voltage systems for which expanded cable or conductor of the invention had been engineered and designed.

The present invention represents and is addressed to an improved expanded conductor or cable structure which not only provides the desirable properties attendant increased outer circumference, but also provides for interior ventilation thereof to permit a more useful upper range of voltage and current carrying capacity in the absence of deleterious operating temperatures of power distribution and transmission systems employing the same.

It is therefore an object of the present invention to provide a preferably all metallic, expanded electrical transmission cable or conductor having interior axially extending ventilating passages therethrough.

Another object of the invention is to provide an expanded high potential or high voltage electric power transmission cable or conductor characterized by an elongate high tensile strength central reinforcing core supporting a plurality of circumferentially equispaced spirally or helically laid electrically conductive strands providing supporting contact thereon of an oppositely generally spirally laid layer of electrically conductive strands radially outwardly spaced from the central core, each of which latter wires or strands being permanently kinked out of true cylindrical or helical trace at its points of contact with the underlying first applied layer of circumferentially equispaced conductors to provide positive interlocking unitary assembly of the elongate central core and overlying electrically conductive strands.

A further object of the invention is to provide one or more helically disposed or laid layers of cylindrically tracing circumferentially contacting electrically conductive wires or strands in overlying support on the outermost non-cylindrical or polygonally kinked conductive strands, referred to in the unitary interlocked assembly described in the previous paragraph, it being significant in this respect that the additional spirally or helically applied conductive strands, as well as the polygonally kinked layer of strands, are of opposite lay in adjacent contacting layers of the same.

Other objects and advantages of the expanded power transmission cables or conductors of the invention will be more fully understood and appreciated from the following description, taken in conjunction with the appended illustrations, in which:

FIG. 1 represents a fragmentary elevational view of a length of expanded cable or conductor fabricated and constructed in accordance with one embodiment of the invention, succeeding layers, lays or courses of the stranded elements thereof being broken away to more clearly reveal the structure of the cable or conductor;

FIG. 2 represents an end elevational and directional developmental view, to slightly enlarged scale, of a single skeletal expanding conductor strand in one complete helical lay of the same, as viewed from the left of FIG. 1;

FIG. 3 represents an end elevational and directional developmental view, also to slightly enlarged scale, of a single conductor strand kinked at substantially equal axial length intervals in one complete generally helical lay of the same providing permanently deformed contacting engagement and interlocking assembly with four underlying circumferentially equispaced skeletal expanding conductor strands, similar to the single strand shown in FIG. 2, and as viewed from the left of FIG. 1;

FIGS. 4 through 8 represent transverse cross-sectional views, to the same scale as FIGS. 2 and 3, taken on the planes 4—4, 5—5, 6—6, 7—7 and 8—8, respectively of FIG. 1;

FIG. 9 represents a fragmentary elevational view of a length of expanded cable or conductor fabricated and constructed in accordance with a second embodiment of the invention, succeeding layers, lays or courses of the stranded elements thereof being broken away to more clearly reveal the structure of the cable or conductor;

FIG. 10 represents an end elevational and directional developmental view, to slightly enlarged scale, of a skeletal expanding single conductor strand in one complete helical lay of the same, as viewed from the left of FIG. 9;

FIG. 11 represents an end elevational and directional development view, also to slightly enlarged scale, of a single conductor strand kinked at substantially equal axial length intervals in one complete generally helical lay of the same providing permanently deformed contacting engagement and interlocking assembly with four underlying circumferentially equispaced conductor strands, similar to the single strand illustrated in FIG. 10, and as viewed from the left of FIG. 9;

FIGS. 12 and 13 represent transverse cross-sectional views, to the same scale as FIGS. 10 and 11, taken on the planes 12—12 and 13—13, respectively, of FIG. 9; and FIG. 14 represents a transverse cross-sectional view, to still larger scale than FIGS. 10 through 13, taken on the plane 14—14 of FIG. 1.

Basically, expanded and axially ventilated cables or conductors responding to the practice of the invention comprise a central reinforcing core, preferably in the form of a conventional elongate helically close stranded metallic wire cable, upon the outer cylindrical surface of which core a layer of circumferentially non-contacting equispaced skeletal expanding electrically conductive metallic wires or strands is helically laid, the strands so disposed being secured in their equispaced disposition by a second layer of metallic electrically conductive wires or strands in opposite overlying contacting spiral or generally helical lay, each kinked at its points of crossover and contact with each of the equispaced skeletal expanding strands of the underlying layer thereof to thereby provide a unitary interlocked and assembled cable construction the outer kinked strands of which define a transverse polygonal cross-section with the contiguous enclosing sides thereof formed by substantially flat chords or reaches between the kinks therein bridging the spaces between the underlying circumferentially equispaced conductor strands.

The outer layer of kinked and polygonally defining strands may be applied in close contacting circumferential arrangement thereof, or they may be applied in circumferentially equispaced disposition in circumferentially staggered or offset relationship to their underlying circumferentially equispaced conductor strands. In either construction, one or more oppositely disposed spirally or helically laid circumferentially contacting cylindrical courses or layers of metallic conductor strands or wires are preferably provided and supported on the heretofore described outer layer of polygonally defining strands or wires, with at least the innermost circumferentially equispaced strands providing axially extending interior ventilating channels or passages through the expanded conductors thus described.

In more detail, and referring to the illustrations appended hereto, FIGS. 1 through 8 discloses one embodiment of an expanded interiorily ventilated conductor falling within the scope of the invention. It will be observed that the conductor thus illustrated comprises a central reinforcing core 10, preferably in the form of helically stranded galvanized steel wires 12 of relatively high tensile strength. Supported on the outer cylindrical surface of the core 10 is at least one layer or serving of electrically conductive preferably non-ferrous skeletal expanding wires or strands 14, in circumferential equispaced helically laid disposition, at least four substantially equal diameter strands 14 being preferred.

A second layer, course or serving of electrically conductive preferably non-ferrous strands or wires 16 is provided in opposite generally spiral or helical overlay in respect to the strands 14, the strands 16 being also preferably circumferentially equispaced and offset to substantially bisect the circumferential spacing of the strands 14. Significant and important to the practice of the invention is the structural feature incorporated in each of the strands 16 wherein they are permanently deformed or kinked beyond their elastic limit where each strand 16 crosses over and contacts an underlying strand 14, the reaches or bridging lengths 18 of each strand 16, between adjacent spaced pairs of the strands 14, defining substantially flat or straight line tangential chords forming a transverse polygonally shaped exterior trace or outline, as best seen in FIGS. 3 and 5 through 8.

It will be apparent from the aforesaid description, and in the case of the four strand selection for the strands 14 and 16, that the outer transverse cross-sectional configuration of the overlying kinked strands 16 produces a substantially true octagon trace or enclosing outline for each of the strands 16 in one complete generally helical lay of the same.

The permanently deformed or kinked strands 16 have performed in practice to provide interlocking unitary assembly of the skeletal structure comprising the central elongate core 10 and overlying circumferentially equispaced servings or layers of the innermost and outermost strands 14 and 16. One or more circumferentially contacting servings of preferably non-ferrous electrically conductive wires or strands 20 and 22 are thereafter preferably applied in conventional helical or spiral disposition to provide an outer transverse substantially cylindrically-configurated conductor or cable, the intermediate servings of the strands 14 and 16 providing axially extending ventilating and weight reducing passages through the radially expanded cable or conductor thus fabricated.

A second embodiment of the invention is illustrated in FIGS. 9 through 14. Therein the central elongate cylindrically and helically stranded reinforcing core 26 is preferably fabricated from galvanized high tensile strength steel strands 28 and supports a helically laid serving of circumferentially equispaced preferably non-ferrous electrically conductive strands 30, of which there are preferably four equal diameter wires or strands. In this embodiment, however, the skeletal expanding strands 30 support a serving of circumferentially contacting preferably non-ferrous electrically conductive wires or strands 32 generally helically and oppositely laid to the strands 30, as was the case of the strands 16 of the first embodiment of the invention. The strands 32 constituting this layer or serving are also each permanently deformed or kinked beyond their elastic limit at their points of crossover and underlying contact with each of the skeletal strands 30 and provide unitary interlocked assembly therewith. One or more circumferentially contacting helically applied servings of preferably non-ferrous electrically conductive wires or strands 34 and 36 complete this embodiment of the invention, the layer or layers of strands 34 and 36 being oppositely helically laid to provide an exposed transverse cylindrical configuration having the inside transverse cross-sectional circumference defined by a circle in circumscribing contact with the points of intersection of the substantially straight or flat chords 38 defining the octagon configuration or trace of the strands 32, as in the case of the strands 16 and overlying strands 20 and 22 of the first embodiment of the invention.

Again it will be observed that the circumferentially equispaced strands 30 produce axially extending ventilating and weight reducing passages through the conductor of the second embodiment of the invention.

Production fabricated expanded cables or conductors have been manufactured to commercial specifications and tested under recorded tensile stress-strain loading conditions in aerially strung 1200 foot spans of the same and have exhibited exceptionally favorable service results without any evidence of failure or collapse of the interlocking unitary assembly and axial passages provided by the kinked or permanently deformed overlying skeletal strands 16 on 14, of the conductor structure of FIGS. 1 through 8, as has the similar interlocking unitary assembly and axial passages provided by the kinked or permanently deformed strands 32 on 30, of the embodiment described and illustrated in reference to FIGS. 9 through 14. In fact, the aforesaid interlocked unitary assembly comprising the central core 10 and skeletal expanding strands 14 and 16, in the first described embodiment of the invention, has withstood flexible coiling, without collapse, on conventional cable drums for storage thereof prior to subsequent stranding application of its outer conductor servings 20 and 22. In similar fashion, the interlocked unitary assembly of the second described embodiment of the invention, comprising the central core 26 and skeletal expanding strands 30 and 32, has also withstood, without collapse, conventional flexible drum coiling and storage thereof prior to receiving the outer servings of conductor strands 34 and 36.

Expanded axially ventilated, reduced weight electrical conductors or cables have been fabricated in accordance with both embodiments of the invention to meet commercially stipulated specifications for 3,092,000 circular mil steel-reinforced aluminum conductors. The expanded cables so fabricated have been successfully energized to 500 kilovolt power transmission, and have experienced recorded operating temperatures ranging from 60° F. to 220° F. without any evidence of undesirable corona discharge. In fact, it has also been possible to employ the expanded ventilated electrical conductors of the invention in even higher impressed voltage installations without ionizing the air to produce undesirable corona discharge, which has not been the case where conventional close concentric helically contacting non-expanded steel-reinforced aluminum conductor of equal circular mil capacity and tensile strength had been employed under the same and elevated impressed voltages.

Although the expanded conductors or cables forming the basis of the invention have been specifically and preferably described in terms of central steel-reinforced, overlying aluminum conductor strand structures, it will be manifest to those skilled in the art that equivalent materials may be employed and substituted therefor without departing from the intended scope of the invention, as hereinafter claimed.

What is claimed is:

1. An expanded high voltage conductor comprising a central cylindrical elongate core of reinforcing material, at least one layer of circumferentially equispaced electrically conductive skeletal strands helically laid and supported on the exterior surface of the said central core, at least one additional layer of oppositely generally helically laid electrically conductive strands supported on outer surfaces of the equispaced electrically conductive skeletal strands, each of said strands in the additional layer thereof being permanently deformed and angularly kinked to provide substantially straight chords bridging the spaces between the adjacent underlying equispaced skeletal strands, the kinks in each strand of the additional layer thereof defining the corners of a polygonal trace in one complete generally helical lay of each said strand, at least one layer of circumferentially contacting helically laid electrically conductive strands supported on the additional layer of kinked strands underlying the same in opposite lay thereto, said last mentioned strands being disposed in circular transverse trace having an inner circumference circumscribing the corners of the polygonal transverse traces formed by the additional layer of kinked strands, and said layer of circumferentially equispaced skeletal strands forming lateral walls of axially extending passages radially outwardly disposed from the center of the conductor.

2. An expanded high voltage conductor comprising a central cylindrical elongate core of reinforcing ferrous metal, a layer of four circumferentially equispaced non-ferrous electrically conductive skeletal strands helically laid and supported upon the exterior cylindrical surface of the elongate core, an additional layer of oppositely generally helically laid non-ferrous electrically conductive strands supported on outer surfaces of the four equispaced electrically conductive skeletal strands, each of said strands in the additional layer thereof being permanently deformed and angularly kinked at its points of contact with each of the underlying four skeletal circumferentially equispaced strands to provide substantially flat tangential chords bridging the spaces therebetween, the kinks in each strand of the additional layer thereof defining the corners of a substantially octagonal trace in one complete generally helical lay of each said strand, at least one layer of circumferentially contacting helically laid non-ferrous electrically conductive strands supported on the additional layer of kinked strands underlying the same in opposite lay thereto, said last mentioned strands being disposed in circular transverse trace having an inner circumference circumscribing the corners of the octagonal transverse traces formed by the additional layer of kinked strands, and said layer of circumferentially equispaced skeletal strands forming lateral walls of axially extending passages radially outwardly disposed from the center of the conductor.

3. An expanded high voltage conductor comprising a central cylindrical elongate core of reinforcing ferrous metal, a layer of circumferentially equispaced non-ferrous electrically conductive skeletal strands helically laid and supported upon the exterior cylindrical surface of the elongate core, an additional layer of circumferentially equispaced non-ferrous electrically conductive strands in opposite generally helical overlying contacting disposition on the first layer of circumferentially equispaced skeletal strands at their points of crossover, each of said strands in the second layer thereof substantially bisecting the spacing between adjacent equispaced skeletal strands in the first layer thereof and each being permanently deforming and kinked at the aforementioned crossover points to provide substantially flat tangential chords spanning the spaces between adjacent spaced skeletal strands in the first layer thereof, the kinks in each strand in the second layer of the same defining the corners of a substantially polygonal transverse trace in one complete generally helical lay of the same, at least one outer layer of circumferentially contacting non-ferrous electrically conductive strands in opposite helical lay to that of the immediately underlying layer of kinked strands, said outer layer strands cylindrically circumscribing the corners of the polygonal transverse traces of the underlying kinked strands, and said layers of circumferentially spaced strands constituting axially extending and unobstructed spiral passages radially outwardly disposed from the central reinforcing core of the conductor.

4. An expanded high voltage conductor comprising a central cylindrical elongate core of reinforcing ferrous metal, a layer of four circumferentially equispaced non-ferrous electrically conductive skeletal strands helically laid and supported upon the exterior cylindrical surface of the elongate core, an additional layer of four circumferentially equispaced non-ferrous electrically conductive strands in opposite generally helical overlying contacting disposition on the first layer of four circumferentially equispaced skeletal strands at their points of crossover, each of said strands in the second layer thereof bisecting the spacing between the spaced skeletal strands in the first layer thereof and each being permanently deformed and kinked beyond its elastic limit at the aforementioned crossover points to provide substantially flat tangential chords spanning the spaces between adjacent spaced skeletal strands in the first layer thereof, the kinks in each strand in the second layer of the same defining the corners of a substantially octagonal transverse trace in one complete generally helical lay of the same, at least one outer layer of circumferentially contacting non-ferrous electrically conductive strands in opposite helical lay to that of the immediately underlying layer of kinked strands, said outer layer strands cylindrically circumscribing the corners of the octagonal transverse traces of the underlying kinked strands, and said layers of circumferentially spaced strands constituting axially extending ventilating and weight reducing passages radially outwardly disposed from the central reinforcing core of the conductor.

5. An expanded high voltage conductor comprising a close contacting stranded central cylindrical elongate core of reinforcing metal strands, a layer of four circumferentially equispaced electrically conductive skeletal metal strands helically laid and supported upon the exterior cylindrical surface of the elongate core, an additional layer of circumferentially contacting electrically conductive metal strands in opposite generally helical overlying contacting disposition on the layer of four circumferentially equispaced skeletal strands at their points of crossover, each of said strands in the second layer thereof being permanently deformed and kinked at the aforementioned crossover points to provide substantially flat tangential chords spanning the spaces between the adjacent spaced skeletal strands in the first layer thereof, the kinks in each strand in the second layer of the same defining the corners of a substantially octagonal transverse trace in one complete generally helical lay of the same, at least one outer layer of circumferentially contacting electrically conductive metal strands in opposite helical lay to that of the immediately underlying layer of kinked strands, said outer layer strands cylindrically circumscribing the corners of the octagonal transverse traces of the underlying kinked strands, and said layer of circumferentially spaced four skeletal strands constituting axially extending weight reducing passages radially outwardly disposed from the central reinforcing core of the conductor.

6. An expanded high voltage conductor comprising a close contacting stranded central cylindrical elongate core of reinforcing metal strands, a layer of four circumferentially equispaced electrically conductive skeletal metal strands helically laid and supported upon the exterior cylindrical surface of the elongate core, an additional layer of circumferentially contacting electrically conductive metal strands in opposite generally helical overlying contacting disposition on the layer of four circumferentially equispaced skeletal strands at their points of crossover, each of said strands in the second layer thereof being permanently deformed and kinked beyond its elastic limit at the aforementioned crossover points to provide substantially flat tangential chords spanning the spaces between the adjacent spaced skeletal strands in the first layer thereof, the kinks in each strand in the second layer of the same defining the corners of a substantially octagonal transverse trace in one complete generally helical lay of the same, at least one outer layer of circumferentially contacting electrically conductive metal strands in opposite helical lay to that of the immediately underlying layer of kinked strands, said outer layer strands cylindrically circumscribing the corners of the octagonal transverse traces of the underlying kinked strands, and said layer of circumferentially spaced four skeletal strands constituting axially extending ventilating passages radially outwardly disposed from the central reinforcing core of the conductor.

References Cited by the Examiner

UNITED STATES PATENTS 1,999,273  4/1935  Austin _____ 174—128

FOREIGN PATENTS 549,885  12/1957  Canada.

LEWIS H. MYERS, *Primary Examiner.*

JOHN F. BURNS, *Examiner.*

D. A. KETTLESTRINGS, H. HUBERFELD,
*Assistant Examiners.*